United States Patent [19]

Heuser et al.

[11] 4,309,179

[45] Jan. 5, 1982

[54] FLEXOGRAPHIC PRINTING ON TEXTILES

[75] Inventors: Arthur R. Heuser, Rock Hill, S.C.; Richard Bolstad, Bronx, N.Y.

[73] Assignee: Inmont Corporation, Clifton, N.J.

[21] Appl. No.: 171,777

[22] Filed: Jul. 24, 1980

[51] Int. Cl.$^3$ .............................................. C09B 67/00
[52] U.S. Cl. ........................................... 8/558; 8/603; 8/637; 106/23; 260/29.4 UA; 260/39 P
[58] Field of Search .................. 8/558, 603, 637; 106/23; 260/29.4 UA, 39 P

[56] References Cited

U.S. PATENT DOCUMENTS

| | | | |
|---|---|---|---|
| 3,138,567 | 6/1964 | Abrams et al. | 260/29.4 R |
| 3,223,663 | 12/1965 | Altobelli et al. | 260/28.5 |
| 3,922,244 | 11/1975 | Stephens et al. | 260/29.7 UA |
| 3,926,888 | 12/1975 | Cheung et al. | 260/29.4 UA |
| 3,928,273 | 12/1975 | Chang et al. | 260/29.4 UA |
| 3,978,016 | 8/1976 | Perronin et al. | 260/29.4 UA |
| 4,065,316 | 12/1977 | Baron et al. | 260/39 P |
| 4,163,001 | 7/1979 | Carumpalds et al. | 260/29.4 UA |

*Primary Examiner*—A. Lionel Clingman
*Attorney, Agent, or Firm*—F. W. Wyman; M. R. Chipaloski

[57] ABSTRACT

A method of printing on textile with pigmented aqueous inks using the flexographic printing process. The printing inks contain water soluble acrylic resin, water soluble thermosetting aminoplast, and elastomeric latex polymer as pigment binder. The inks have a viscosity of 3 to 15 poises at infinite shear.

10 Claims, No Drawings

FLEXOGRAPHIC PRINTING ON TEXTILES

The present invention relates to printing on textiles with pigmented aqueous inks using the flexographic printing process. According to the prior art, colored prints have been applied to textiles by the Intaglio gravure printing process and by the screen printing process. In both of these processes relatively large volumes of the thickened printing paste can be applied to textiles as required to obtain the desired intensity of print or decoration. On the other hand, flexographic printing on textiles has not been extensively employed because of several reasons; a major one being that it has been difficult to obtain prints having a desirable intensity of color because of the relatively small amount of ink that is transferred in the flexographic process. Flexographic printing, or flexography, is a type of relief printing wherein the printing plate, made of flexible rubber is mounted on a metal cylinder. Flexographic printing is used extensively for printing on all types of paper products including tissue, cardboard, and the like, and for printing on plastic foils and films. A description of the flexographic printing process and the inks used in the process may be found in numerous prior art references, e.g. E. A. Apps, Printing Ink Technology, Leonard Hill Ltd., London 1958, Chapter 24, pages 391-399 and "Printing Ink Manual," Chapter 15, by the Society of British Printing Ink Manufacturers, published in 1961 by W. Heffer & Sons, Ltd., Cambridge, England.

The present invention is based on the discovery that the flexographic printing process can be used for printing on textiles provided certain critically formulated inks containing water soluble acrylic polymers are used. For flexographic printing on textiles it is necessary to use aqueous inks having relatively high levels of pigment, compared with conventional textile inks and a high level of water soluble acrylic polymer which, in addition to serving as a pigment binder, also provides carry-up, or running properties on the press. Latex binder and melamine cross-linking resin are included to give required fastness properties. Print pastes for printing flexographically on textiles are formulated without water thickeners, as used for conventional intaglio roller printing of textiles, and without the high pigment and/or extender loading used in flexographic inks for printing on paper. Also, the aqueous inks for flexographic printing on textiles generally have viscosities of about 10-65 poises at 20 RPM on a Brookfield Viscosimeter and about 3 to 15 poises at infinite shear as determined by Casson plot. These viscosities are substantially different from those required for printing on paper, viz. about 1 poise at 20 RPM on a Brookfield Viscosimeter and about 1 poise at infinite shear as determined by Casson plot. Similarly, the viscosity of conventional pigmented textile print pastes differ markedly from the viscosities of the pastes of the present invention; such conventional textile print pastes have Brookfield viscosities of 80 to 120 poises at 20 RPM and infinite shear viscosities of about 6 poises.

The invention, to date, has been used for printing on muslins, percales and broadcloths.

In accordance with a preferred embodiment of the invention the binder system for the ink consists of (a) an acrylic resin terpolymer containing 30 to 55 percent by weight styrene, 20 to 35 percent by weight acrylic acid or methacrylic acid and 15 to 40 percent by weight of N-methylol acrylamide or N-methylol methacrylamide, (b) a water soluble melamine-formaldehyde aminoplast and (c) an elastomer latex.

The acrylic resins useful in the invention are readily prepared by peroxide catalyzed polymerization of the monomers, for instance in a water miscible volatile organic solvent, such as a lower alkanol, followed by removal of part, or all, of the alkanol, and dissolving the terpolymer in aqueous ammonia. Preferred terpolymers for use in the present invention are those of relatively low molecular weight, e.g. 3,000 to 6,000; an acid number of 200 to 260, an equivalent weight of 190 to 245, and containing 15 to 40 percent, by weight, of the methylol amide monomer. Such terpolymers are self-cross-linking when heated. The print paste will preferably contain 9 to 35 percent, by weight, water soluble cross-linkable resin, part of which may be water-soluble thermosetting methoxymethyl melamine. The methoxymethyl melamine content is preferably no more than about 30 percent of the water soluble resin components, e.g. 10 to 30 percent.

A suitable acrylic terpolymer consists of the solution polymerized terpolymer of 33 parts of styrene, 27 parts acrylic and 40 parts N-methylol acrylic amide prepared in iso-propanol (153 parts) using 2.3 parts of benzoyl peroxide catalyst; then adding 44.3 parts 28 percent ammonium hydroxide and 127 parts of water and removing volatiles by distillation to a solids content of 34.5 percent. This resin solution is referred to in the examples as Resin Solution A.

In a less preferred embodiment of the invention up to about one-half of the water soluble acrylic resin need not contain the N-methylol acrylamide monomer. Such less preferred water soluble acrylic resins do not cure as rapidly as the polymers containing N-methylol acrylamide.

The elastomer latices that are useful include those conventionally used in pigmented textile printing pastes. The preferred elastomers are the butadiene-acrylonitrile elastomers, especially the carboxylated butadiene-acrylonitrile elastomers. Such elastomers are conventionally used in the printing of textiles with pigments. They are described, for instance, in U.S. Pat. No. 3,223,663.

The amount of pigment in the print paste will depend on the depth of shade of color to be printed. For example, for full shades 7 to 10 percent pigment, by weight, may be used, although up to 12 percent may be required for deeper shades. The lower limit of pigment is not particularly critical and may be as low as 1 percent or lower for very light shades.

In general, the ratio of water-soluble acrylic polymer to pigment will be in the range of 0.6 to 2.5 parts of polymer for each part of pigment for full shades but can be as high as 20 to 1, or higher, when printing very light shades.

The preferred print pastes of the invention contain conventional amounts of water insoluble elastomer to impart rub fastness. The elastomer is added as latex and generally in an amount within the range of 0.5 to 5.0 parts of solid elastomer per part of pigment, or 5 to 16 percent, by weight, of the paste. The elastomer may be any of those commonly used for the purpose however, the preferred elastomer is the butadiene-acrylonitrile type.

Water soluble thermosetting aminoplast is generally used in the range of 0.2 to 2.0 parts per part of pigment. The preferred aminoplast is a methoxymethyl melamine, especially hexamethoxymethyl melamine.

Total solids of the print paste of the present invention are on the order of 20 to 50 percent, preferably 28 to 42 percent, and the total binder to pigment ratio is preferably 1.5 to 6 parts, for each part by weight of pigment for full shades but can be as high as 30 to 1 when printing light, or pastel shades.

The invention to date has been carried out using a flexographic printing press equipped with an engraved chromium plated roller as the ink feeding roller. The depth of etching on this roller, which rotates in the ink, determines the amount of ink fed to the printing cylinder. For strong, i.e. darker prints, an engraving of 120 trihelical design is most effective; for printing both solid areas and fine detail a 140 trihelical design is preferred. The hardness of the rubber printing plate used has some influence on the results obtainable. It has been determined that plates of moderate hardness, e.g. 50 to 55 durometer Shore A hardness give best results.

In the following examples and throughout the application wherein parts of materials used, the parts are by weight unless otherwise stated.

EXAMPLE 1

A printing ink containing styrene/acrylic acid/N methylol acrylamide terpolymer, hexamethoxymethylol melamine and butadiene/acrylonitrile elastomer as the binder was prepared from

|  | Parts |
|---|---|
| Resin A Solution (34.5%) | 48.0 |
| Glycerol (Humectant) | 24.0 |
| Ammonium Hydroxide (28%) | 0.8 |
| Red Shade Phthalocyanine Blue Presscake (30% Pigment) | 27.2 |
| Tributyl Phosphate (Anti-foam Agent) | 0.4 |
| Givgard Solution (Biocide consisting of 10% Solution of 6-acetoxy-2,4-dimethy-m-dioxane in water) | 1.2 |
| Hexamethoxymethyl Melamine, as 60% Aqueous Solution (e.g. Cymel 300) | 5.0 |
| Butadiene/Acrylonitrile Latex (38%) | 15.0 | by mixing in a high speed mixer. The resulting ink was printed on textiles by the flexographic process to give medium dark blue prints having good light fastness, washfastness, crockfastness, and very little show-through, when printed on 50/50 polyester/cotton muslin sheeting, 100% polyester batiste, 80/20 polyester/cotton broadcloth, 100% acetate satin, 100% acetate tricot, polyester/cotton knit, polyester/percale, polyester/cotton muslin and cellulose non-woven. The ink as printed contained 2.07 parts of Resin A per part of pigment, 0.37 parts of hexamethoxymethyl melamine per part of pigment and 0.71 part of butadiene/acrylonitrile elastomer per part of pigment. The ink as printed had a Brookfield viscosity of 17 poises (at 25° C. and 20 R.P.M. and No. 4 Spindle) and 10 poises at infinite shear. The total binder to pigment ratio in the ink as printed was about 3.1 parts by weight of binder to 1 part by weight of pigment. The ink contains a total of about 19.6% of water soluble resin made up of 16.6% water soluble acrylic resin and 3% of hexamethoxymethyl melamine:

EXAMPLE 2

A printing ink was prepared from:

|  | Parts |
|---|---|
| Resin Solution A | 21.3 |
| Glycerol | 1.3 |
| Ammonium Hydroxide (28%) | 0.4 |
| Green Shade Phthalocyanine Blue (53% Solids Presscake | 16.2 |
| Givgard Solution (as in Example 1) | 0.6 |
| Tributyl Phosphate | 0.2 |
| Cymel 300 (as in Example 1) | 5.0 |
| Carboxylated Butadiene-acrylonitrile Elastomer Latex (38%) | 55.0 |

The ink produced good medium blue flexographic prints on textiles. The ink did not show appreciable penetration ink into or through the fabric. The ink contains 8.56% pigment, 7.34% of soluble acrylic resin, 3% hexamethoxymethyl melamine and 20.9% butadiene-acrylonitrile elastomer or a total of 3.67 parts of binder to each part of pigment. The viscosity of the ink was 62 poises (Brookfield No. 4 Spindle at 20 R.P.M.) and 15 poises at infinite shear.

EXAMPLE 3

An ink was prepared from:

|  | Parts |
|---|---|
| Resin Solution A | 37.20 |
| Glycerol | 2.40 |
| Ammonium Hydroxide (28%) | .56 |
| Diarylide Yellow Presscake (25.9% Pigment) | 38.24 |
| Givgard Solution (as in Example 1) | 1.20 |
| Tributyl Phosphate | .40 |
| Cymel 300 | 5.00 |
| Butadiene/Acrylonitrile Latex (as in Example 1) | 15.00 |

The ink contained 9.9% pigment and gave medium yellow prints on polyester/cotton muslin fabric having excellent fastness properties and little penetration of the ink through the fabric. The binder of pigment ratios were:

|  | Parts |
|---|---|
| Soluble Acrylic Resin | 1.29 |
| Aminoplast Resin | 0.3 |
| Latex Polymer for each part of pigment | .57 |
| Total Solids of the Print Paste | 31.4% |

The water soluble acrylic polymer comprised 12.8% of the total weight of the printing ink composition. The viscosity at 25° C. was 14 poises (Brookfield, 20 R.P.M., #4 Spindle) and 8 poises at infinite shear.

EXAMPLE 4

A flexographic ink for printing on textiles was prepared from:

|  | Parts |
|---|---|
| Resin Solution A (34.5%) | 38.1 |
| Joncryl 678 (a 36/28/36 Terpolymer of Styrene/Acrylic Acid/Ethyl Acrylate Mol. wt. approx. 5000, Acid No. 200) | 6.6 |
| Glycerol | 2.4 |
| Ammonia (28% in water) | 2.3 |
| Scarlet Pigment Presscake (21.1% Pigment obtained by coupling Diazotized 3-amino-4-methyl benzamide with |  |

-continued

| | Parts |
|---|---|
| Naphthol AS-E) | 44.4% |
| Givgard Solution (as in Example 1) | 1.2 |
| Tributyl Phosphate | .4 |
| Cymel 300 | 5.0 |
| Latex (as in Example 1) | 15.0 |

The ink gave bright red prints on polyester/cotton muslin fabric. The prints had good wash fastness, crackfastness and lightfastness. Total pigment concentration in the ink was 9.4% and the binder to pigment ratios were 1.41 parts of soluble acrylic, 0.32 part of methoxymethyl melamine and 0.61 part of latex polymer for each part pigment. The water soluble acrylic polymer comprised 13.3% of the total ink formula, methoxymethyl melamine comprised 3% of the total ink formula and the latex polymer comprised 5.7% of the total ink formula. The viscosity was 24.4 poises, Brookfield 20 R.P.M., No. 4 Spindle, and 5 poises at infinite shear.

EXAMPLE 5

A water soluble acrylic polymer was made as follows:

Ingredients

A. 35.65% Isopropanol, Anhydrous
B. 7.73% Styrene
C. 0.28% Benzoyl Peroxide Catalyst
D. 6.21% Glacial Acrylic Acid
E. 11.64% N-Methylolacrylamide (48% in water)
F. 0.85% Methyl Ethyl Ketone
G. 0.13% Benzoyl Peroxide Catalyst
H. 27.20% Deionized Water
I. 10.31% Concentrated Ammonium Hydroxide Items A-D were mixed and one-third of the mixture was heated in a reaction vessel and stirred until dissolved. A mixture of E with the remaining two-thirds of A-D was added to the one-third of A-D in the reaction vessel at reflux over a period of two hours. Reflux was continued for one hour after the addition was completed and F and G were added over 5 minutes. Reflux was continued for two hours and H and I were added. The mixture was then azeotropically distilled to a solid contact of 40%, cooled to 49° C. and concentrated ammonium hydroxide added to adjust to a pH of 8.5. The terpolymer contains 39.6% styrene, 31.8% acrylic acid and 28.6% N-methylol acrylamide and has an acid number of 242 (calculated). A 35% solids solution of the terpolymer has a viscosity of 42 to 76 poises (Brookfield 100 R.P.M., No. 4 Spindle).

The above terpolymer was used to prepare a textile printing ink in accordance with the invention as follows:

| Concentrate Blue Ink (20% Pigment) | Parts |
|---|---|
| Terpolymer Solution (34.8% Solids viscosity 42 poises, Brookfield #4, 20 R.P.M. | 34.3% |
| Colloid 999 Antifoam Agent | .6% |
| Dowicide A (33.3% Solution of sodium o-phenyl phenol in water) | 1.0% |
| Concentrated Ammonia (28%) | 1.0% |
| 1,3-Butylene Glycol | 3.0% |
| Phthalocyanine Blue Presscake (33.3%) | 60.0% |

The above ingredients were mixed in a high speed mixer and then passed through a carborundum mill. The resulting concentrate color contained 20% pigment and about 12% terpolymer. The concentrate color was reduced to 10% pigment as follows:

| | Parts |
|---|---|
| Concentrate Blue Ink | 50.0% |
| Terpolymer Solution (34.8% Solids) | 11.0% |
| Latex (43.5% Carboxylated Butadiene-Acrylonitrile Latex) | 30.0% |
| Cymel 300 (60% Aqueous Solution of Hexamethoxy Methyl Melamine) | 5.0% |
| Water | 4.0% | to obtain an aqueous printing ink in accordance with the invention and containing approximately 12.8% water soluble resin components and 13% latex polymer. The ink had a total solids content of about 35.8%, a viscosity of about 15 poises (Brookfield #4 Spindle at 20 R.P.M.) and an infinite shear viscosity of 9.5 poises as determined from a Casson plot.

The ink was printed on 50/50 polyester/cotton muslin fabric on a Heinrich Flexographic Press and the prints were cured at 300° F. (149° C.) for 3 minutes. The color strength and print quality of the cured prints were very good. Washfastness of the cured prints was excellent and fastness to dry and wet crocking was good.

EXAMPLE 6

Pillowcase fabric 42 inches wide was printed in a red and blue geometric pattern on a four-deck 64 inch Packer flexographic press equipped with a Mount Hope tension control and guidance unit. The anilox rollers had a 120 line trihelical engraving; plates were made at 50-55 Durometer hardness.

The red and blue inks were prepared by first preparing base colors and reducing the base colors with the desired amounts of acrylic terpolymer solution, water, elastomer latex and methoxymethyl melamine for the inks that were printed.

| Base Colors | Red | Blue |
|---|---|---|
| 1,4-Butane diol | 3.00% | 3.00% |
| Dowicide A Solution (30%) | 1.00% | 1.00% |
| Ammonia (28%) | 1.00% | 1.00% |
| Acrylic Terpolymer (38%) as in Example 5 | 31.60% | 31.65% |
| Water | 25.58% | 10.33% |
| Azo Red (Hilton Davis 2R6-68-C-118, 53% Presscake) | 37.80 | |
| Phthalo Blue, Red Shade Type, Toyo 8-218FW, 37.8% Presscake | | 53.00% |
| Byk 073 (Antifoam Agent) | .02% | .02% |
| | 100.00% | 100.00% |
| Base Color | 42.5% | 45.0% |
| Acrylic Terpolymer (38%) as in Example 5 | 10.0% | 10.0% |
| Water | 12.5% | 10.0% |
| Butadiene-Acrylonitrile Latex (43.5%) | 30.0% | 30.0% |
| Cymel 300 Solution (60%) | 5.0% | 5.0% |

The red and blue inks contained 8.5% and 9% pigment, respectively, and had total binder to pigment ratios of 2.9 to 1 and 2.8 to 1. The red ink had a Brookfield viscosity of 13.5 poises and the blue ink was 14 poises, both measured with No. 6 Spindle at 20 R.P.M. The infinite shear viscosities were 8 poises and 3 poises, respectively.

Good prints were obtained at printing speed of 35 yards per minute and at 156 yards per minute. Print definition was sharp with only slight penetration. Satisfactory prints were obtained on 50/50 polyester/cotton fabrics and the prints were fast to crocking and washing when cured.

EXAMPLE 7

An ink for printing at 5% pigment contains:

|  | Percent |
|---|---|
| Water Soluble Acrylic Terpolymer of Example 4 | 15.0 |
| Hexamethoxymethyl Melamine | 3.0 |
| Elastomer | 10.0 |
| Pigment | 5.0 |

The ink has a total solids content of 33% and is made by mixing a color concentrate base ink with appropriate amounts of acrylic terpolymer solution, latex, Cymel, and water as follows:

| Concentrate Color Base of Example 5 (20% Pigment 12% Acrylic Terpolymer) | 25.0 |
|---|---|
| Acrylic Terpolymer Solution (35%) | 34.2 |
| Butadiene-Acrylonitrile Latex (43.5%) | 23.0 |
| Cymel (60%) | 5.0 |
| Water | 12.8 |
|  | 100.0 |

EXAMPLE 8

An ink containing 2% pigment is made by mixing concentrate color base ink, acrylic terpolymer solution, latex, Cymel and water as follows:

|  | Percent |
|---|---|
| Concentrate Color Base of Example 5 | 10.0 |
| Acrylic Terpolymer Solution (35%) | 53.6 |
| Butadiene-acrylonitrile Latex (43.5%) | 11.5 |
| Cymel 300 | 3.3 |
| Water | 21.6 |

EXAMPLE 9

An ink containing 1% pigment is made by mixing concentrate color base ink, acrylic terpolymer solution, latex, Cymel and water as follows:

|  | Percent |
|---|---|
| Concentrate Color Base of Example 5 | 5.0 |
| Acrylic Terpolymer Solution of Example 5 | 55.5 |
| Latex of Example 5 | 11.5 |
| Cymel 300 | 3.3 |
| Water | 24.7 |

The ink has a total solids content of 28% made up of approximately 1% pigment, 5% elastomer, 2% hexamethoxymethyl melamine and 20% water soluble acrylic terpolymer. The ink has an infinite shear viscosity of 5-10 poises.

What is claimed is:

1. An aqueous ink for printing on textiles by the flexographic printing method, said ink consisting essentially of:
   (a) 9 to 35% of water soluble components consisting of (1) water soluble acrylic resin binder and (2) water soluble thermosetting melamine aminoplast;
   (b) 5 to 16% of finely divided water insoluble carboxylated elastomer polymer binder, incorporated into said ink as a latex,
   (c) 1 to 12% of colored pigment and
   (d) water wherein the total solids of said ink is 20 to 50%, and the ink has a viscosity of about 3 to 15 poises at infinite shear.

2. An ink as claimed in claim 1 wherein the water soluble acrylic resin is the terpolymer obtained by polymerizing a mixture of 30 to 55% by weight of styrene, 20 to 35% by weight of acrylic acid or methacrylic acid and 15 to 40% by weight of N-methylol acrylamide or N-methylol methacrylamide.

3. An ink as claimed in claim 2 wherein the aminoplast resin is hexa-methoxymethyl melamine.

4. An ink as claimed in claim 3 wherein the total binder to pigment ratio is 1.5 to 30 parts of binder for each part by weight of pigment.

5. An ink as claimed in claim 1 wherein the water soluble acrylic resin component is a mixture of (1) the terpolymer obtained by polymerizing 30 to 55% by weight of styrene, 20 to 35% by weight of acrylic acid or methacrylic acid, and 15 to 40% by weight of N-methylol acrylamide or N-methylol methacrylamide and (2) hexamethoxy methyl melamine.

6. An ink as claimed in claim 5 wherein the total solids content of the ink is 20 to 50% by weight and the total binder to pigment ratio is 1.5 to 30 parts of binder for each part by weight of pigment.

7. An ink as claimed in claim 6 wherein the elastomer is carboxylated butadiene-acrylonitrile elastomer.

8. An ink as claimed in claim 7 wherein the binder to pigment ratio is within the range of 1.5 to 6.0 parts of binder per part of pigment.

9. A method of printing on textile fabrics comprising:
   (A) applying to a flexographic printing plate an ink consisting essentially of:
   (a) 9 to 35% of water soluble components consisting of
   (1) water soluble acrylic resin and (2) water soluble thermosetting melamine aminoplast resin;
   (b) 5 to 16% of finely divided water insoluble carboxylated elastomer polymer, incorporated into said ink as a latex,
   (c) 1 to 12% of colored pigment and
   (d) water wherein the total solids of said ink is 20 to 50%, and the ink has a viscosity of about 3 to 15 poises at infinite shear.

10. A method of printing on textiles as claimed in claim 9 wherein the flexographic printing plate has a Durometer hardness of 50-55.

* * * * *